W. AVERY.
Vegetable Cutter.

No. 6,599.

Patented July 17, 1849.

UNITED STATES PATENT OFFICE.

WYLLYS AVERY, OF SALISBURY CENTER, NEW YORK.

VEGETABLE-CUTTER.

Specification of Letters Patent No. 6,599, dated July 17, 1849.

*To all whom it may concern:*

Be it known that I, WYLLYS AVERY, of Salisbury Center, in the county of Herkimer and State of New York, have invented certain new and useful Improvements in Apparatus for Cutting Vegetables, and that the following is a full, clear, and exact description of the principle or character which distinguishes them from all other things before known and of the usual manner of making, modifying, and using the same, reference being had to the accompanying drawing, which forms a part thereof, in which—

Figure 1:
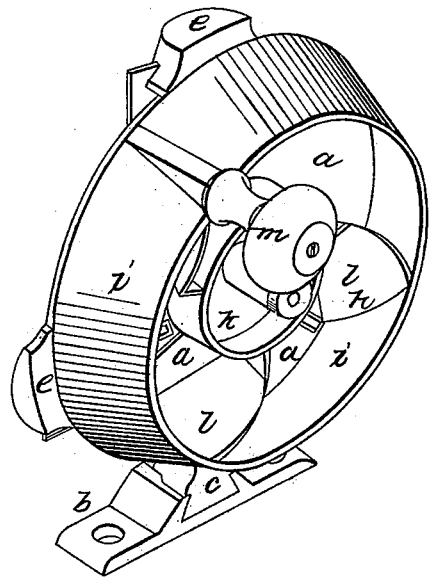
Figure 2:
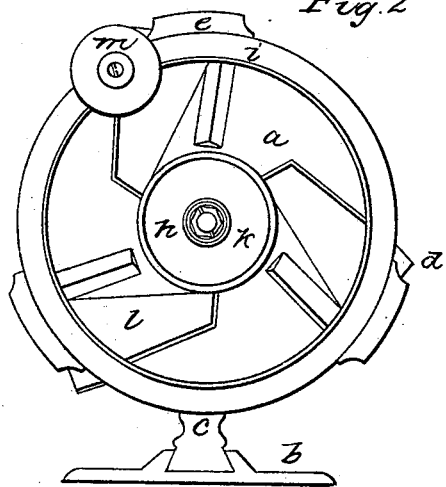
Figure 3:
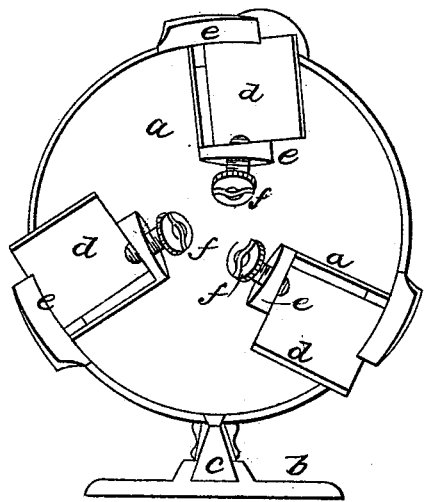

Figure 1, is an isometrical view. Fig. 2, is a top plan. Fig. 3, is a plan of the under side.

My improvement consists in causing the hopper in which the vegetables are put to revolve around the knives, which are stationary, and furnishing said hopper with inclined curved partitions, or arms, which serve to hold the vegetables in contact with the knives while cutting.

The construction is represented in the various figures of the drawing, and consists of a stout metallic plate ($a$,) of circular form, connected in any way to a permanent fixture. The mode represented in the drawing for this attachment, is by means of a plate ($b$,) which can be screwed to the side of a wall, which plate has a dove-tailed groove in it, into which a shank ($e$,) projecting horizontally from the plate ($a$,) slides, and fits; in this plate ($a$,) three, more or less knives ($d$,) are fitted, through radial slits made in it for that purpose; these knives are similar to plane irons in form, and are set at about the same angle, the slits serving as the throats of the planes; they are fastened by means of two lugs ($e$,) that project down from the underside of the plate, against which the edges of the knives rest; and through one of these lugs, a set screw ($f$,) passes to fasten the knife or plane iron. The edge of these knives project above the face of the plate far enough to cut the article introduced into the hopper. From the center of the plate ($a$,) a stud ($h$,) stands up, which serves as a pivot for a circular hopper to turn on; this hopper ($i$,) is in the form of a truncated cone, the base of which runs close to the plate ($a$,); its center or hub ($k$,) has arms, a partition ($l$,) projecting from it; which join the hub to the hopper; these arms stand at a tangent with the hub, and are also inclined to the horizon or plate ($a$,) in which the knives are set, so that when vegetables of any shape or size are placed in the hopper, the arms will hold them down against the knives during their revolution, and cause them to be cut till they are all passed through. By this form and construction of hopper and arms or partitions ($l$,) any irregular formed substance is at one brought into contact with the knives in such a way as to force them to cut it: a handle ($m$,) may be attached to the hopper by which it is turned.

Having thus fully described my improved apparatus for cutting vegetables, what I claim therein as new, and for which I desire to secure Letters Patent, is—

Constructing the hopper in the manner set forth, by means of the combination of inclined arms and spreading sides in the manner and for the purpose set forth, and combining it with and revolving it over a series of stationary knives, as set forth.

WYLLYS AVERY.

Witnesses:
JAMES HOPSON,
JOHN WIGGINS.